Patented July 9, 1940

2,207,072

UNITED STATES PATENT OFFICE 2,207,072

PREPARATION OF REFRACTORY MATERIAL

Gilbert E. Seil, Cynwyd, Pa., assignor to E. J. Lavino and Company, Philadelphia, Pa., a corporation of Delaware No Drawing. Application August 25, 1938, Serial No. 226,684

2 Claims. (Cl. 106—9)

This invention relates to refractory materials and it has particular reference to refractory materials which are heat treated to drive off the volatile constituents of the starting material and to effect the crystallization of the high melting point compounds formed in the heat treatment, so that a clinker of high density and low porosity is formed, the product being rendered essentially inert to the action of moisture by the heat treatment, and showing no appreciable shrinkage when it is fired to form the body which is eventually subjected to the service for which it is intended.

One of the materials to which this invention is applicable is dolomite. Dolomite is the double carbonate of lime and magnesium, and has the empirical formula $CaCO_3.MgCO_3$. The pure compound is not found naturally in commercially available quantities. Natural dolomite contains varying amounts of impurities such as silicon, iron oxide and aluminum oxide, and the proportions of calcium and magnesium vary considerably from the theoretical formula, so that there are high lime dolomites and high magnesia dolomites, or dolomitic calcites and dolomitic magnesites.

Natural dolomite is made into a refractory material by dead-burning, that is calcining it to a temperature at which the volatile material is driven off, and at which the magnesium carbonate is converted to crystallized periclase, the calcium carbonate being converted at the same time to calcium oxide. The burning is usually done in a shaft furnace or in a rotary kiln, and in the course of the burning, the material loses from 40% to 50% of its weight as the carbon dioxide is driven off. The crystallization and clinkering also result in a volume change so that the finished product occupies only 40% to 50% of the volume of the dolomite from which it was made.

In the dead-burning of dolomite the magnesium is rendered essentially inert to the action of water. Calcium oxide will slake with water, although this property is retarded somewhat by the temperature of treatment and by the presence of the impurities, such as silica, iron and alumina, which act as fluxing oxides and tend to stabilize a portion of the lime present. In order to obtain a product of especially high density and low porosity, the calcining process is sometimes repeated, yielding the so-called "double-burned" dolomites.

Dead-burned and double-burned dolomites are used in open hearth practice as a material for maintaining the bottoms of the furnaces. The presence of free lime, which is very susceptible to reaction with water, even atmospheric moisture, precludes the application of the burned dolomites to other fields, such as for example, the manufacture of brick. Attempts to stabilize the lime have resulted in many patents describing the admixture with the starting dolomite of various percentages of fluxing oxides before the calcination. Other methods of stabilization include the addition to the starting material of calculated amounts of silica, and heat treating to a temperature sufficient to cause the conversion of the calcium to calcium orthosilicate, or, if desired, to calcium orthosilicate and monticellite.

The last named method is covered by my co-pending application Serial No. 122,786, filed January 28, 1937, in which I described the conversion of dolomitic materials into stable high melting point silicate refractories. The invention is practiced by adding calculated amounts of finely divided silica to the dolomitic starting material, and heating the mixture to a point above the critical temperature at which the lime and the silica are converted into calcium orthosilicate, but below the fusion temperature of the mass. If the molecular percentage of lime is exactly twice the molecular percentage of silica, only calcium orthosilicate is formed by these compounds, and the magnesium present is converted to periclase. If the molecular percentage of silica equals the molecular percentage of lime in the mix, these compounds will unite with an equal molecular percentage of magnesium oxide to form calcium magnesium orthosilicate (monticellite). Lime to silica ratios between the molecular percentages given yield materials containing both calcium orthosilicate and monticellite, thus the ratio of lime to silica determines definitely whether the product will contain calcium orthosilicate, or monticellite, or both.

The temperature at which the mixture can be burned to a dense clinker depends upon the percentage of monticellite formed. In every case I add an excess of silica beyond the chemical requirements for forming calcium orthosilicate with the lime of the mixture to assure the formation of some monticellite, thus precluding the presence of free lime or of tricalcium silicate in the finished product. The amount of silica in excess of that required for the conversion of the lime in the mixture to calcium orthosilicate is chosen in accordance with the percentage of monticellite desired. Thus I have prepared a refractory material comprising essentially periclase, calcium orthosilicate and monticellite, in which the monticellite is varied as desired from 1% to 15% depending upon the refractory qualities desired, the temperature required to burn the mixture to a dense clinker decreasing as the percentage of monticellite increases.

Another method of preparing stable refractories from dolomitic starting materials is described in my co-pending application Serial No. 125,118, filed February 10, 1937, in which I show that the lime in dolomitic material can be stabilized by heat treating the material in intimate mixture with alumina and silica forming, in accordance with the amounts of alumina and silica used, calcium aluminate ($CaO.Al_2O_3$), calcium orthosilicate, monticellite if desired, and periclase. Corundum, bauxite or diaspore may be used as sources of alumina; ganister, quartzite or tripoli as sources of silica; and aluminum silicates such as kyanite, sillimanite, andalusite, or clay as sources of both alumina and silica.

When the mixture is heated the first critical point is reached at the temperature at which calcium aluminate is formed. The next compounds formed are calcium orthosilicate, and monticellite if any uncombined silica remains, the remainder of the magnesium being converted to periclase. The alumina addition is so chosen that the lime is always in molecular excess of the $Al_2O_3$, so that after the formation of the calcium aluminate, some lime remains for the formation of calcium orthosilicate, or monticellite, or both, as desired, since the amounts of these compounds depend upon the ratio of this residual lime to the silica present. In no case do I use alumina and silica in such molecular deficiency with respect to the lime that free and uncombined lime is found in the finished product, nor do I use sufficient alumina and silica to permit the formation of silicates other than orthosilicates.

In both the above mentioned co-pending applications I have shown the use of phosphates or borates as stabilizers to prevent the inversion of the calcium orthosilicate from the form which is stable at high temperatures to the form which is stable at low temperatures.

Another field in which the present invention is particularly applicable is in the production of magnesia refractories. Magnesia refractories are usually prepared from natural magnesite or other natural minerals or chemically produced compounds by heat treating to a temperature at which the volatile matter is driven off and at which the magnesia is crystallized. Dead-burned magnesite is relatively inert to the action of water and is widely used for the manufacture of brick, for making furnace bottoms, and for making monolithic furnace linings and repairs. As in the case of dolomitic materials, the composition of the finished material determines its refractory characteristics, and the magnesium bearing starting materials are often corrected by the additions thereto of various fluxing oxides and other corrective materials before burning, and the temperature at which the mixture can be sintered to a dense granular clinker is dependent upon components other than periclase it contains.

Thus it is known practice to add to natural magnesite of high purity a certain percentage of iron oxide to facilitate the formation of a dense clinker and to impart certain desired characteristics. It is also known practice to balance the lime and silica present so as to cause the formation of calcium orthosilicate, and it is known practice to add sufficient silica to cause the formation of monticellite from the small amount of lime present, any excess silica uniting with some of the magnesia to form magnesium orthosilicate. When the starting materials are natural minerals, such as magnesite or brucite, the extent to which the composition and the characteristics of the finished product can be controlled is, of course, limited by the amount and the character of the impurities present as mined, and upon the variation in the raw material as delivered for the calcining operation.

If the starting material is a chemically produced magnesium material, the limitations imposed on the composition of the finished product are, for practical purposes, removed. Any composition, and hence any refractory characteristics can be obtained as desired.

Thus in my co-pending application Serial No. 123,603, filed February 2, 1937, I have shown how the deleterious effects of small amounts of lime present in a dead-burned refractory material made from natural magnesite are minimized by causing the lime to be dispersed as monticellite in a relatively large amount of magnesium orthosilicate. This object is accomplished by adding finely divided silica to a magnesite clinker of relatively low lime content in proportions of the order of 15% of $SiO_2$ in the finished body. The mixture is formed into brick or other shapes, dried and heated above the critical temperature at which magnesium orthosilicate is formed on the surface of the periclase particles by reaction between the silica and the magnesium oxide. The lime present is converted to monticellite, and since the monticellite is dispersed in a relatively large amount of magnesium orthosilicate its effect is for all practical purposes eliminated.

In another co-pending application Serial No. 221,734 filed July 28, 1938, I have shown how the characteristics of magnesia refractories are controlled when starting with a chemically produced magnesium compound, which on heating, yields crystallized magnesium oxide. The temperature at which a magnesia refractory material can be formed into a hard dense clinker is determined by the amount of low melting point material the product contains. By the addition to the starting material of various amounts of lime and silica, the ratio of one to the other being controlled so as to yield definite amounts of calcium orthosilicate and monticellite, I have produced refractory materials which are sintered into hard dense clinker at various desired temperatures. I have also shown how the burning of such clinker into refractory bodies is facilitated by using them in admixture. The body is more readily formed and more easily maintained in place if it is made from a mixture of two clinkers, one of which is more refractory in its characteristics than the other. This result is obtained because during the firing of the body of the clinker of lower refractoriness will fuse first and act as a bond to hold in place the more refractory particles.

Although the refractoriness of a clinker, that is the temperature at which it will fuse, is determined by the chemical and mineralogical composition of the material, the practical uses to which the clinker can be put are largely determined by other factors, such as the degree to which the material resists hydration, its hardness, its porosity, its freedom from shrinkage on heating, and its chemical uniformity from piece to piece. Thus I have found magnesia refractory materials, and corrected dolomite refractory materials, which, although burned to stabilization, and having very high fusion points, were not satisfactory for use in brick manufacture or for rammed-in furnace linings or for rammed-in furnace repairs because, even after double burning in a rotary kiln they were fragile and high in porosity and because the shrinkage had not been substantially all removed.

In calcining natural magnesites, 100 pounds of starting material having a specific gravity of 2.9 to 3.1 yield about 50 pounds of dead burned magnesite having a specific gravity of 3.5 to 3.7, so that the dead burning of natural magnesite is accompanied by a reduction in volume of 60%. It is most important that the preparation of the dead burned material be carried out in such a manner that a product of high density, low porosity, and freedom from further shrinkage is obtained. The difficulties encountered in the use of fragile, porous clinkers are readily apparent. They can not be crushed into suitable mesh ratios for brick manufacture, and shrinkage of the particles will cause distortion, cracking, and failure if they are formed into a furnace bottom, or a rammed-in furnace section.

The production of a hard clinker, of maximum density, minimum porosity, and minimum shrinkage is the primary object of this invention. The object is accomplished by fine grinding the starting materials, adding any desired correctives in a finely divided form, mixing until uniform, preferably in a dry state, then tempering and pressing the mixture into brick. The brick are burned on a suitable time-temperature curve and in a controlled atmosphere in a tunnel kiln or in a periodic kiln and then crushed and used either as clinker or remade into brick as desired. The clinker obtained in this manner is harder, more dense, less porous and lower in residual shrinkage than clinker prepared in any other fashion. The essence of the invention lies in the preparation of the clinker by performing the calcination on the material after it has been pressed into brick, then burning the brick in a suitable kiln, and crushing the brick.

The time-temperature relationship of the temperature treatment is an important feature of the invention. When the calcination is done in a rotary kiln the heat treatment is usually completed in from 30 minutes to 90 minutes. I have burned many tons of clinkers in a rotary kiln 75 feet long and 5 feet in inside diameter at temperatures in excess of 3100° F. The total length of the heat treatment in such a kiln is from 52 to 60 minutes. I have found that this rapid heat treatment does not always yield a satisfactory clinker. I have found that a clinker produced by the time-temperature cycle attained in a periodic kiln or a tunnel kiln always yields a clinker of lower porosity, higher density, and superior characteristics if the starting materials are first fine ground, then dry mixed, then tempered and pressed into brick. A normal periodic kiln burn at the temperatures applicable to this invention is made on a schedule in which the brick reach the maximum temperature in four to ten days, are maintained at the maximum temperature for one to three days, and are slowly cooled in five to seven days. A normal tunnel kiln burn is made in three and one-half days to five days. The time-temperature relationship in a three and one-half day (84 hours) burn is approximately as follows:

At end of 24 hours_____ 1800° F.
At end of 40 hours_____ 3150° F.
At end of 48 hours_____ 3150° F.
At end of 60 hours_____ 2000° F.
At end of 84 hours_____ Atmospheric I have also accomplished the degree of calcination required by my invention in a tunnel kiln 327 feet long, with a firing zone 122 feet long and with a capacity of 60 cars, by pushing the kiln charge one car length every 15 minutes and maintaining a maximum temperature zone equivalent to 3 car lengths. In accordance with this practice the time of the heat treatment was 15 hours and the material was maintained at the maximum temperature for forty-five minutes.

It is an essential feature to the practice of my invention that the time-temperature cycle be such that the maximum temperature of calcination be maintained for a minimum of forty-five minutes. Such a time-temperature relationship is obviously impractical in rotary kiln practice and explains my preference for a tunnel kiln or a periodic kiln where the relationship is under control. In a tunnel kiln or a periodic kiln the time-temperature relationship of the heat treatment can be varied at the will of the operator. Although the maximum temperature must be maintained for a minimum time of forty-five minutes, I have found that if the time of exposure to the maximum temperature is increased the maximum temperature may be decreased somewhat. In other words the result obtained with some materials in forty-five minutes at a temperature of 3350° F. will be obtained at a slightly lower temperature, say 3250° F., if the time of treatment is increased to one hundred and twenty minutes.

Control of the atmosphere is essential when the product contains materials, for example, chrome ore, in which there are oxides reducible to metals. Carbon dioxide will reduce FeO to metallic iron at the temperature involved, and chrome ore is reduced to ferro-chromium by hydrogen in the furnace atmosphere. Although the metallic substances are re-oxidized later in the burn, the various spinels of which they were constituents are not reformed and the refractory characteristics of the product are impaired.

As a practical example of the results obtained by my invention,—I have prepared by various methods magnesite clinkers of the analysis commonly used in open hearth practice for furnace bottoms and for furnace repairs. The chemical analysis of such clinker is approximately the following:

| | Per cent |
|---|---|
| Silica | 5.00 |
| Ferric oxide | 6.50 |
| Alumina | 1.60 |
| Lime | 2.50 |
| Magnesia | 84.40 |

Clinkers were prepared by the following methods, (a) by calcining in a rotary kiln a slurry of fine ground, high purity, natural magnesite to which fine ground correctives were added to give the desired analysis, the calcination temperature being approximately 3150° F., (b) by a single burn calcination in a rotary kiln of a slurry composed of finely divided chemically produced magnesia material and correctives to give the desired analysis, the calcination temperature being approximately 3150° F., (c) a double burn calcination at approximately the same temperature of the clinker produced by method (b) above, and (d) a single burn in a tunnel kiln of the mixture described in (b) above comprising the following steps. (1) Dry mixing until uniform the finely ground artificially prepared magnesia material and the correctives, (2) tempering the mixture and forming it into brick in a dry press under a molding pressure of approximately 6000 pounds per square inch, using 0.5% of an organic binder to provide green strength in the brick, (3) drying and burning the brick in a tunnel kiln at a temperature of about 3150 F. and maintaining that temperature for 24 hours, and then (4) crushing the brick to the desired clinker size.

The porosities and the true specific gravities of the four clinkers, all of which are substantially the same chemical analysis, are shown in the following table:

| Method | Material | Treatment | Type of kiln | Porosity | True specific gravity |
|---|---|---|---|---|---|
| | | | | Percent | |
| (a) | Natural magnesite plus correctives | Single burn at 3150° F | Rotary | 24.38 | 3.603 |
| (b) | Artificial magnesite plus correctives | Single burn at 3150° F | do | 32.41 | 3.567 |
| (c) | Clinker produced by method (b) | Double burn at 3150° F | do | 27.00 | 3.567 |
| (d) | Artificial magnesite plus correctives | Dry mixed—pressed into brick—single burn at 3150° F. | Tunnel | 13.50 | 3.580 |

I have also prepared magnesite clinkers of the analysis commonly used for making low-iron magnesite brick, special furnace linings, furnace repairs, etc. by the four methods previously described, the clinkers having approximately the following chemical anlysis:

| | Per cent |
|---|---|
| Silica | 5.00 |
| Ferric oxide | 1.00 |
| Alumina | 0.80 |
| Lime | 2.00 |
| Magnesia | 91.20 |

The results are given in the following tabulation:

The uniformity or variation in the product is shown by the analysis of various sizes obtained by grinding the material. I have taken each of the magnesia materials given as examples, ground them, and determined the silica in various sizes. In the clinkers produced from natural magnesites, the silica content was higher in the finer sizes, in the chemically produced magnesites the silica was constant. The actual results are tabulated below:

| Size | Material I (85% MgO) | | Material II (91% MgO) | |
|---|---|---|---|---|
| | Natural | Chemically produced | Natural | Chemically produced |
| Thru 8 on 20 mesh | 4.50% SiO$_2$ | 5.64% SiO$_2$ | 4.39% SiO$_2$ | 4.60% SiO$_2$ |
| Thru 20 on 40 mesh | 5.63% SiO$_2$ | 5.44% SiO$_2$ | 5.91% SiO$_2$ | 4.80% SiO$_2$ |
| Thru 40 on 100 mesh | 6.55% SiO$_2$ | 5.48% SiO$_2$ | 6.89% SiO$_2$ | 4.97% SiO$_2$ |
| Thru 100 on 325 mesh | 8.64% SiO$_2$ | 5.08% SiO$_2$ | 7.31% SiO$_2$ | 4.32% SiO$_2$ |
| Thru 325 mesh | 9.12% SiO$_2$ | 5.22% SiO$_2$ | 8.03% SiO$_2$ | 3.90% SiO$_2$ |

The low porosities obtained by the use of my invention are indicative of the extent to which the shrinkage has been burned out of the starting materials. Although refractory materials of high porosity, and therefore susceptible to appreciable shrinkage on heating to service temperatures, are being satisfactorily used for some applications, such as furnace bottoms in certain cases, the field in which high porosity materials can be used is limited. Thus I have found that in brick manufacture the refractory grain should have

| Method | Material | Treatment | Type of kiln | Porosity | True specific gravity |
|---|---|---|---|---|---|
| | | | | Percent | |
| (a) | Natural magnesite plus correctives | Single burn at 3150° F | Rotary | 21.69 | 3.528 |
| (b) | Artificial magnesite plus correctives | Single burn at 3150° F | do | 56.29 | 3.500 |
| (c) | Clinker produced by method (b) | Double burn at 3150° F | do | 42.28 | 3.500 |
| (d) | Artificial magnesite plus correctives | Dry mixed—pressed into brick—single burn at 3150° F. | Tunnel | 12.50 | 3.503 |

The porosities and the true specific gravities given in the examples were determined in accordance with the method C20—20 of the American Society for Testing Materials.

An advantage in the use of chemically prepared magnesites lies in the uniformity of the product from piece to piece. Such uniformity can not be obtained when the starting materials are natural magnesites or other minerals which yield periclase on heating. When the as-mined material is of a high standard of purity, clinkers of desired compositions are made by blending with the high grade magnesite various correctives before the calcining operation. The products obtained under these conditions are non-uniform in that they vary in analysis from piece to piece. Under the conditions of manufacture variation is unavoidable because the magnesite itself varies from mine to mine and from section to section in the same mine. Variation in analysis from piece to piece results in variation in properties from piece to piece, with the result that different pieces will vary in fusion point, hardness, etc.

a maximum porosity of 20%, and preferably of 15% or even lower. Porosities higher than 20% cause shrinkage, cracking and deformation of the brick on burning, resulting in high kiln losses and increased manufacturing costs if the brick is fired before installation, and poorer service if the brick is chemically bonded and used in the unfired state.

My invention provides a method for producing refractory materials of minimum porosity appreciably free from shrinkage at manufacturing and service temperatures from substances which are crystallized and stabilized at high temperatures. Substances which can be prepared according to my invention include clinkers of dead burned dolomite with or without corrective additions of lime, silica, fluxing oxides, etc. as previously explained, and clinkers of dead burned magnesite with or without corrective additions of lime, silica, fluxing oxides, etc. as previously explained. The invention is also applicable to the preparation of recrystallized chromite from chrome ore as described in my U. S. Patent No.

2,028,017, where I have described the preparation of a refractory material comprising recrystallized chromite surrounded by a glass of magnesium silicate, the magnesium silicate being derived from the gangue materials in the chrome ore. The result is obtained by heating the starting materials to a temperature at which recrystallization of the chromite takes place, and above the temperature at which the gangue minerals melt and distribute themselves around and about the chromite crystals.

The invention is further applicable to the production of clinker comprised of chromite surrounded and bonded by magnesium orthosilicate, as described in my U. S. Patents 2,028,018 and 2,037,600. In these patents I describe the preparation of a refractory material comprising recrystallized chromite bonded by magnesium orthosilicate, the result being obtained by adding to chrome ore sufficient magnesium oxide to satisfy the chemical requirements for converting the magnesium silicate gangue minerals to magnesium orthosilicate. An excess of magnesium oxide is added above the theoretical requirements in order to bolster the magnesium orthosilicate formed, since magnesium orthosilicate-magnesium oxide mixtures have higher melting points than pure magnesium orthosilicate, but the excess of magnesium oxide must be insufficient to cause decomposition of the chromite spinel, the required additions being between 12.5% and 25% of the weight of the mixture. The mixture is heated to temperatures in excess of 3100° F., that is, above the critical temperature at which magnesium orthosilicate is formed from magnesium silicates and magnesium oxide, but below the fusion point of the mass, and the resulting product is a refractory material consisting of undecomposed, recrystallized chromite surrounded and bonded by bolstered magnesium orthosilicate.

Still further, this invention is applicable to the production of mullite clinkers in accordance with my U. S. Patent 2,102,976, in which I describe the preparation of a mullite refractory material prepared by heating mixtures of the proper proportions of alumina and silica yielding materials to form crystals of mullite $3Al_2O_3.SiO_2$. Examples of the mixtures covered in this patent include kyanite and corundum, clay and corundum, clay and bauxite, but the invention is not limited to the specific examples given. The mixtures are heated to temperatures in excess of 3100° F., which is above the critical point at which mullite is formed from the alumina and silica present, and the resulting product is a refractory material substantially all interlocking crystals of mullite.

The present invention is based upon the discovery that in all the above cases clinker of maximum hardness, maximum density, minimum porosity and minimum susceptibility to shrinkage are obtained by fine grinding the starting materials to pass a No. 40 Bureau of Standards screen and preferably to pass a No. 80 Bureau of Standards screen with about 85% passing a No. 200 Bureau of Standards screen, dry mixing the starting materials until uniform, tempering and pressing the mixture into brick, drying the brick and burning them in a tunnel kiln to a temperature above 3100° F. for at least forty-five minutes and preferably for twenty-four hours to forty-eight hours, and then crushing the brick.

Although I have found it preferable in most cases to separately fine grind the starting materials and then mix them in the desired proportions, it is not always necessary to carry out the two steps in this order. The materials may be dry mixed first and the mixture fine ground to the desired specifications. When this order of procedure is followed the mixing of the starting materials must be done in batches sufficiently large to yield uniform analyses from one batch to the other.

Each of the steps in the process introduces factors essential to the final result. The fine grinding of the starting materials renders them more readily available for the chemical reactions which must take place. The dry mixing is essential to obtain the best possible distribution of the constituents of the mixture. It is almost impossible to obtain a uniform distribution of fine materials in the presence of moisture, because even small percentages of water will cause the materials to ball up, and the balls are not broken and the material is therefore not distributed on further mixing, even in a wet pan with heavy mullers. Making the mixture into a brick under high pressure forces the particles into intimate contact with each other, and facilitates the chemical reaction between them. The relatively slow rate of heating obtained in a tunnel kiln burn permits driving off the volatile constituents of the materials used, and holding the materials at the maximum temperature for an appreciable length of time causes them to come to chemical and physical equilibrium, and solidifies them into a hard, dense body of low porosity.

Having thus described and exemplified my invention, to which examples the scope of the invention is by no means limited, I claim:

1. The process of preparing a refractory clinker which comprises grinding the starting materials so that a substantial portion passes a 200 mesh Bureau of Standards screen, tempering the ground material, pressing the tempered material into shapes at pressures of the order of 6000 pounds per square inch, firing the shapes at temperatures between 3100° F. and substantially 3500° F. for at least 45 minutes, whereby the materials are brought into physical and chemical equilibrium and whereby individual bricks are bonded together to yield large masses of low porosity substantially free of residual shrinkage, and then crushing these masses.

2. The process of preparing a refractory clinker which comprises separately grinding the reactant starting materials so that a substantial portion passes a 200 mesh screen, mixing the ground materials, tempering the mixed ground material, pressing the tempered material into shapes, firing the shapes at temperatures above 3100° F. but below the fusion point of the mass for at least 45 minutes whereby reaction of the reactant materials takes place and the resulting products are brought into physical and chemical equilibrium as well as being formed into hard dense masses of low porosity substantially free of residual shrinkage, and then crushing these masses.

GILBERT E. SEIL.